(12) United States Patent
Sawada

(10) Patent No.: US 8,616,623 B2
(45) Date of Patent: Dec. 31, 2013

(54) VEHICLE SUNROOF DEVICE

(71) Applicant: Aisin Seiki Kabushiki Kaisha, Kariya (JP)

(72) Inventor: Kazuki Sawada, Handa (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/718,139

(22) Filed: Dec. 18, 2012

(65) Prior Publication Data

US 2013/0147237 A1    Jun. 13, 2013

Related U.S. Application Data

(63) Continuation of application No. 13/255,442, filed as application No. PCT/JP2010/055785 on Mar. 31, 2010, now abandoned.

(30) Foreign Application Priority Data

Apr. 27, 2009    (JP) ................................. 2009-108019

(51) Int. Cl.
*B60J 7/185*    (2006.01)
(52) U.S. Cl.
USPC .. 296/224; 296/221; 296/216.03; 296/216.05
(58) Field of Classification Search
USPC ......................... 296/216.02–216.05, 221–224
See application file for complete search history.

(56) References Cited

U.S. PATENT DOCUMENTS

| | | | |
|---|---|---|---|
| 6,325,453 | B1 | 12/2001 | Manders |
| 6,390,545 | B1 | 5/2002 | Makino et al. |
| 7,125,070 | B2 | 10/2006 | Sawada et al. |
| 7,344,188 | B2 | 3/2008 | Sawada et al. |
| 2003/0151275 | A1 | 8/2003 | Ohnishi et al. |
| 2005/0218704 | A1 | 10/2005 | Uehara et al. |
| 2007/0085385 | A1 | 4/2007 | Sawada et al. |
| 2008/0036246 | A1 | 2/2008 | Tsukamoto et al. |
| 2009/0072588 | A1 | 3/2009 | Nakamura |

FOREIGN PATENT DOCUMENTS

| | | |
|---|---|---|
| CN | 1453159 | 11/2003 |
| CN | 1680129 | 10/2005 |
| CN | 101391573 | 3/2009 |

(Continued)

OTHER PUBLICATIONS

International Preliminary Report on Patentability for PCT/JP2010/055785 dated Nov. 22, 2011.

(Continued)

*Primary Examiner* — Dennis Pedder
(74) *Attorney, Agent, or Firm* — Finnegan, Henderson, Farabow, Garrett & Dunner, LLP

(57) ABSTRACT

A vehicle sunroof device includes a movable panel, guide rails, rear slide members, an electrical drive source, and check mechanisms. When the rear slide members are moved toward the front of the vehicle along the guide rails when the movable panel is in a totally closed state, the movable panel is changed to a tilt-up state. Check release mechanisms provided to the rear slide members are changed to an engaged state when the rear slide members are further moved toward the front of the vehicle with the movable panel in the tilt-up state and without involving operation of the movable panel. In the engaged state, when the rear slide members are moved toward the rear of the vehicle afterward, the check release mechanisms move the entire check mechanisms while switching the check mechanisms to a movable state.

8 Claims, 7 Drawing Sheets

(56) References Cited

FOREIGN PATENT DOCUMENTS

| | | |
|---|---|---|
| JP | 08-318739 | 12/1996 |
| JP | 11-227466 | 8/1999 |
| JP | 2001-47867 | 2/2001 |
| JP | 2001-146114 | 5/2001 |
| JP | 2003-278363 | 10/2003 |
| JP | 2005-153803 | 6/2005 |

OTHER PUBLICATIONS

Extended European Search Reort for EP Appl. No. 10769587.6 dated Jul. 13, 2012.
International Search Report dated Jul. 13, 2010 for PCT/JP2010/ 0055785.
Notification of the First Office Action for Chinese Appl. No. 201080011407.4 dated Apr. 24, 2013.

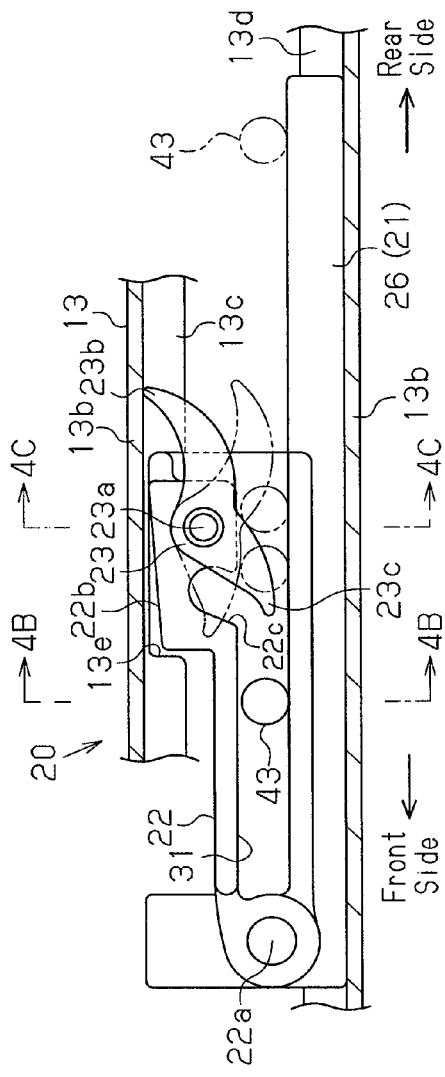
Fig.4(a)
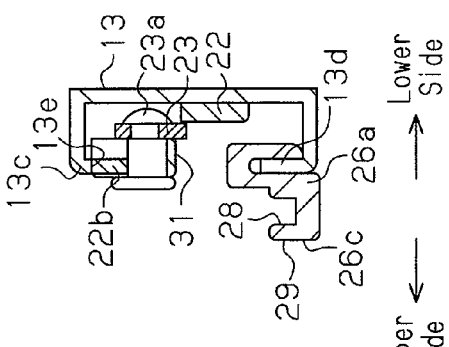
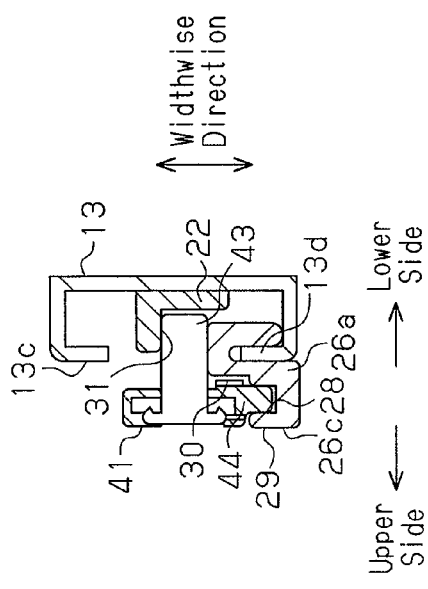
Fig.4(c)
Fig.4(b)

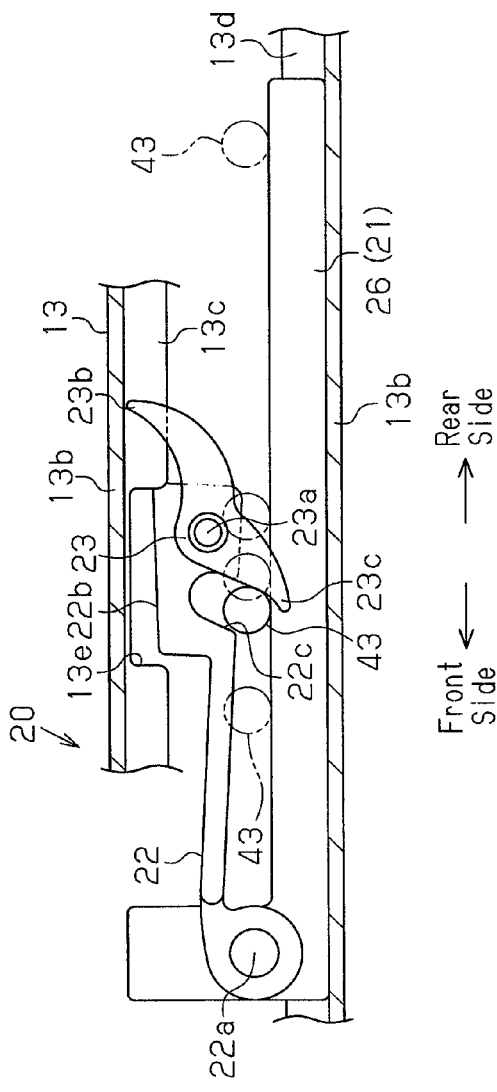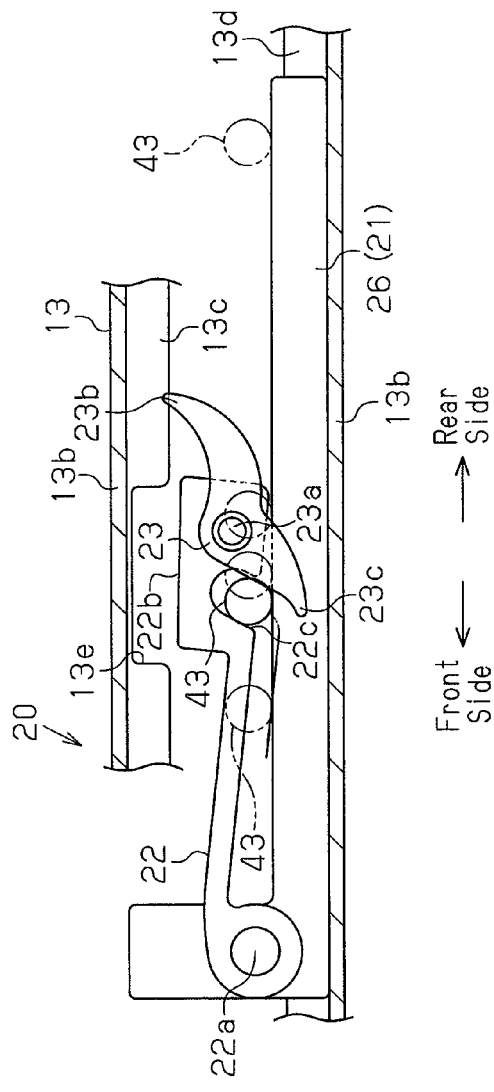

VEHICLE SUNROOF DEVICE

This is a continuation of application Ser. No. 13/255,442, which is a national stage of PCT/JP2010/055785, filed Mar. 31, 2010, which claims priority to Japanese Application No. 2009-108019, filed on Apr. 27, 2009. The contents of each of these applications are incorporated herein by reference.

TECHNICAL FIELD

The present invention relates to a vehicle sunroof device.

In the prior art, a so-called outer slide sunroof device, such as that described in patent document 1, is known as a vehicle sunroof device. In this device, when shoes arranged at the front and rear of the vehicle are moved toward the rear in a fully closed state, the distal end of a lifting link, which is pivotally linked to a guide rail, is lifted. This shifts a movable panel to a tilt-up state. In the tilt-up state, when the shoes are moved further toward the rear, the movable panel moves rearward. This shifts the movable panel to a fully open state in the tilt-up state.

PRIOR ART DOCUMENT

Patent Document

Patent Document 1) Japanese Laid-Open Patent Publication No. 2005-153803

SUMMARY OF THE INVENTION

Problems that are to be Solved by the Invention

In the vehicle sunroof device of patent document 1, the movement amount (operational stroke) of the shoes required for the movable panel to shift from the fully open state to the fully closed state is the movement amount from a position corresponding to the fully closed state to a position corresponding to the fully open state via a position corresponding to the tilt-up state. Thus, an increase in the movement of the shoes from when the movable panel shifts from the fully closed state to the tilt-up state (hereinafter referred to as the "tilt operational stroke") decreases the movement amount of the shoes, that is, the open amount of the movable panel, when the movable panel shifts from the tilt-up state to the fully closed state.

The tilt operational stroke corresponds to a range in which the movable panel is lifted and lowered in a high load state. Thus, a longer tilt operational stroke is preferable. If the tilt operational stroke decreases, the load per unit operational stroke increases. This enlarges the electric drive source (motor or the like) that drives the shoes.

It is an object of the present invention to provide a vehicle sunroof device that increases the open amount of the movable panel without enlarging the electric drive source.

To achieve the above object, one aspect of the present invention provides a vehicle sunroof device including a movable panel, a guide rail, a rear slide member, an electric drove source, and a check mechanism. The movable panel opens and closes an opening formed in a roof of a vehicle. The guide rail is arranged on two edges of the opening in a widthwise direction of the vehicle, wherein the guide rail extends in front and rear directions of the vehicle. The rear slide member is linked to two edges at a rear portion of the movable panel in the widthwise direction and arranged to be movable along the guide rail in the front and rear directions of the vehicle. The electric drive source moves the rear slide member. The check mechanism is hooked to two edges at a front portion of the movable panel in a swingable manner. The check mechanism is selectively switched between an immovable state, in which the check mechanism is held at a predetermined position frontward from the rear slide member in the front and rear directions of the vehicle, and a movable state, in which the check mechanism is allowed to move toward the rear of the vehicle from the predetermined position. When the movable panel is in a fully closed state, the rear slide member moves along the guide rail toward the front of the vehicle to lift the movable panel at its rear side about the front portion hooked to the check mechanism in the immovable state and thereby shift the movable panel to a tilt-up state. The sunroof device includes a check cancellation mechanism arranged on the rear slide member. The check cancellation mechanism, in the tilt-up state, is switched to an engaged state as the slide member further moves toward the front of the vehicle without moving the movable panel, and the check cancellation mechanism, in the engaged state, integrally moves the check mechanism as subsequent movement of the rear slide member toward the rear of the vehicle switches the check mechanism to the movable state. The rear slide member further moves toward the front of the vehicle without moving the movable panel in the engaged state, the check cancellation mechanism is switched to a disengaged state and released from the check mechanism.

In this structure, in the engaged state of the check cancellation mechanism, when the rear slide member moves toward the rear of the vehicle, the check mechanism is switched to the movable state and moved integrally with the check cancellation mechanism toward the rear of the vehicle. Accordingly, the movable panel, which is hooked to the check mechanism, opens in the tilt-up state. In this case, the maximum movement amount of the rear slide member or the like that determines the fully open state of the movable panel is not restricted by the movement amount of the rear slide member in the reverse direction when the movable panel is shifted to the tilt-up state. It is only required that the movement amount be ensured so that it does not move the movable panel, which allows switching of the check cancellation mechanism to the engaged state or the disengaged state. Thus, the maximum movement amount of the rear slide member or the like that determines the fully open state of the movable panel, that is, the open amount of the movable panel, can be increased accordingly.

When the check cancellation mechanism is in the engaged state, further movement of the rear slide member toward the front of the vehicle switches the check cancellation mechanism to the disengaged state. Accordingly, in this state, when the rear slide member moves toward the rear of the vehicle, after the period in which the movable panel does not move, the rear side of the movable panel linked to the rear slide member is lowered about the front side of the movable panel hooked to the check mechanism in the immovable state and the movable panel is shifted to the fully closed state (recovered).

Further, when the movable panel is shifted from the fully closed state to the tilt-up state (or vice-versa), a sufficient movement amount is ensured for the rear slide member. This decreases the load per unit movement amount on the rear slide member and consequently avoids enlargement of the electric drive source.

In the present invention, the hooking of the check mechanism to the two edges at the front portion of the movable panel in a swingable manner includes, in addition to hooking that allows pivoting of the movable panel about the hooking position, hooking that allows pivoting of the movable panel about an axis or hypothetical center set in another member.

Preferably, the check cancellation mechanism includes a projection. The sunroof device further includes a first channel, a second channel, and an urging member. The first channel allows entrance of the guide projection in the immovable state of the check mechanism when the check cancellation mechanism switches to the engaged state as the rear slide member moves toward the front of the vehicle. The second channel is in communication with a front end of the first channel and switches the check cancellation mechanism to the disengaged state when the guide projection enters. The urging member urges and moves the guide projection from the first channel to the second channel in a communication portion of the first channel and the second channel.

Preferably, the check mechanism includes the first channel, the second channel, and the urging member.

In this structure, the switching of the check cancellation mechanism from the engaged state to the disengaged state may be performed with an extremely simple function that causes the guide projection to move into (enter) the second channel from the first channel. Further, by aiding the movement of the guide projection from the first channel to the second channel with the plate spring, the switching of the check cancellation mechanism from the engaged state to the disengaged sate is further ensured.

Preferably, the check mechanism includes an engagement groove. The check cancellation mechanism includes an engagement projection. The engagement projection passes the engagement groove of the check mechanism in the immovable state as the rear slide member moves toward the front of the vehicle. The engagement projection is fitted to the engagement groove by subsequent movement of the rear slide member toward the rear of the vehicle and presses the engagement groove to integrally move the check mechanism.

In this structure, when the check mechanism is in the immovable state, the rear slide member moves toward the front of the vehicle and the engagement projection passes by the engagement groove. Then, movement of the rear slide member toward the rear of the vehicle results in the engagement projection being fitted to the engagement groove and pushing the engagement groove. This integrally moves the check cancellation mechanism toward the rear of the vehicle. In this manner, when the check mechanism moves integrally with the check cancellation mechanism toward the rear of the vehicle, the engagement projection fitted to the engagement groove integrally moves the check mechanism and the check cancellation mechanism toward the rear of the vehicle in a further stable state.

Preferably, the check mechanism includes a check block and a check lever. The check block is hooked to the movable panel and arranged to be movable along the guide rail in the front and rear directions of the vehicle. The check lever includes the engagement groove and is pivotally coupled to the check block. The check lever is urged toward and hooked to a hooking portion formed in the guide rail at the predetermined position to maintain the immovable state.

In this structure, the check mechanism implements the function for hooking the movable panel (i.e., restricting the position of the movable panel in the front and rear directions of the vehicle) and the function for switching between the immovable state and the movable state using two components (check block and check lever). This further ensures the operation of each function.

Preferably, the check mechanism includes an engagement projection restriction lever. The engagement projection restriction lever is pivotally coupled to the check lever, and the engagement projection restriction lever is held at a predetermined initial position engaging the guide rail when receiving urging force. The engagement projection pivots the engagement projection restriction lever against the urging force and passes the engagement groove as the rear slide member moves toward the front of the vehicle. Subsequent movement of the rear slide member toward the rear of the vehicle pushes, with the engagement projection restriction lever, the guide rail, which is engaged with the engagement projection restriction lever, and releases the check lever from the hooking portion.

In this structure, the engagement projection passes by the engagement groove, and the rear slide member then moves toward the rear of the vehicle. This pushes the guide rail, which is engaged with the engagement projection restriction lever, with the engagement projection restriction lever and releases the engagement projection restriction lever from the cutout. In this manner, the pressing force of the engagement projection from the engagement projection restriction lever is relayed to the guide rail. This further ensures switching from the immovable state to the movable state.

Preferably, the sunroof device includes a position detector and a control unit. The position detector detects the position of the rear slide member in the front and rear directions of the vehicle. The control unit controls and drives the electric drive source based on the position of the rear slide member in the front and rear directions of the vehicle. The control unit prohibits deactivation of the electric drive source when the check cancellation mechanism is in a range switched from the engaged state to the disengaged state and the rear slide member moves in a range in the front and rear directions of the vehicle without moving the movable panel.

In this structure, when the rear slide member moves in a range in the front and rear directions of the vehicle in which the check cancellation mechanism switches from the engaged state to the disengaged state without moving the movable panel, the control unit prohibits deactivation of the electric drive source. Accordingly, the rear slide member stops in the range in the front and rear directions of the vehicle from the rear slide member shared by the engaged state and the disengaged state of the check cancellation mechanism, and avoids a situation in which it cannot be determined whether the check cancellation mechanism is in the engaged state or disengaged state.

BRIEF DESCRIPTION OF THE DRAWINGS

FIG. 4(a) is a bottom view showing the operation of the embodiment, and FIGS. 4(b) and 4(c) are cross-sectional views taken along line 4B-4B and 4C-4C;

FIGS. 5(a) and 5(b) are bottom views showing the embodiment;

DETAILED DESCRIPTION OF EMBODIMENTS

One embodiment of the present invention will now be described with reference to the drawings.

Figure 7:
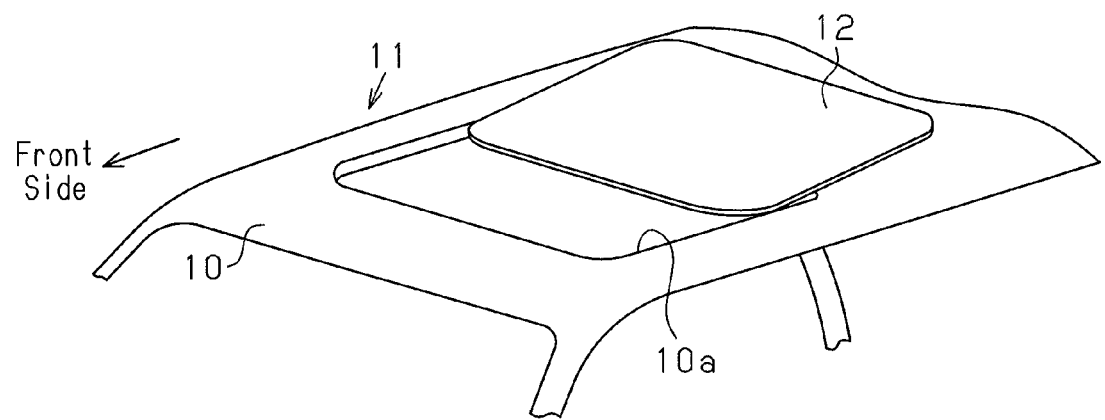
FIG. 7 is a perspective view schematically showing the embodiment.

FIG. 7 is a perspective view of a sunroof device 11 taken from a diagonally upward direction. The sunroof device 11 is mounted on a roof 10 of a vehicle such as an automobile. As shown in the drawing, the roof 10 includes a roof opening 10a. A movable panel 12, which opens and closes the roof opening 10a, is arranged in the roof opening 10a. The movable panel 12 is coupled to the roof 10 so that it can be tilted upward and be slidable in the front and rear directions of the vehicle. The movable panel 12 is of a so-called outer slide type and slides in a tilt-up state when performing an opening and closing operation.

The structure related to the opening and closing of the movable panel 12 will now be described. The sunroof device 11 includes two structures related to the opening and closing of the movable panel 12 and arranged on opposite widthwise sides of the vehicle. The description hereafter will basically refer to the structure at one side in the widthwise direction of the vehicle.

Figure 1:
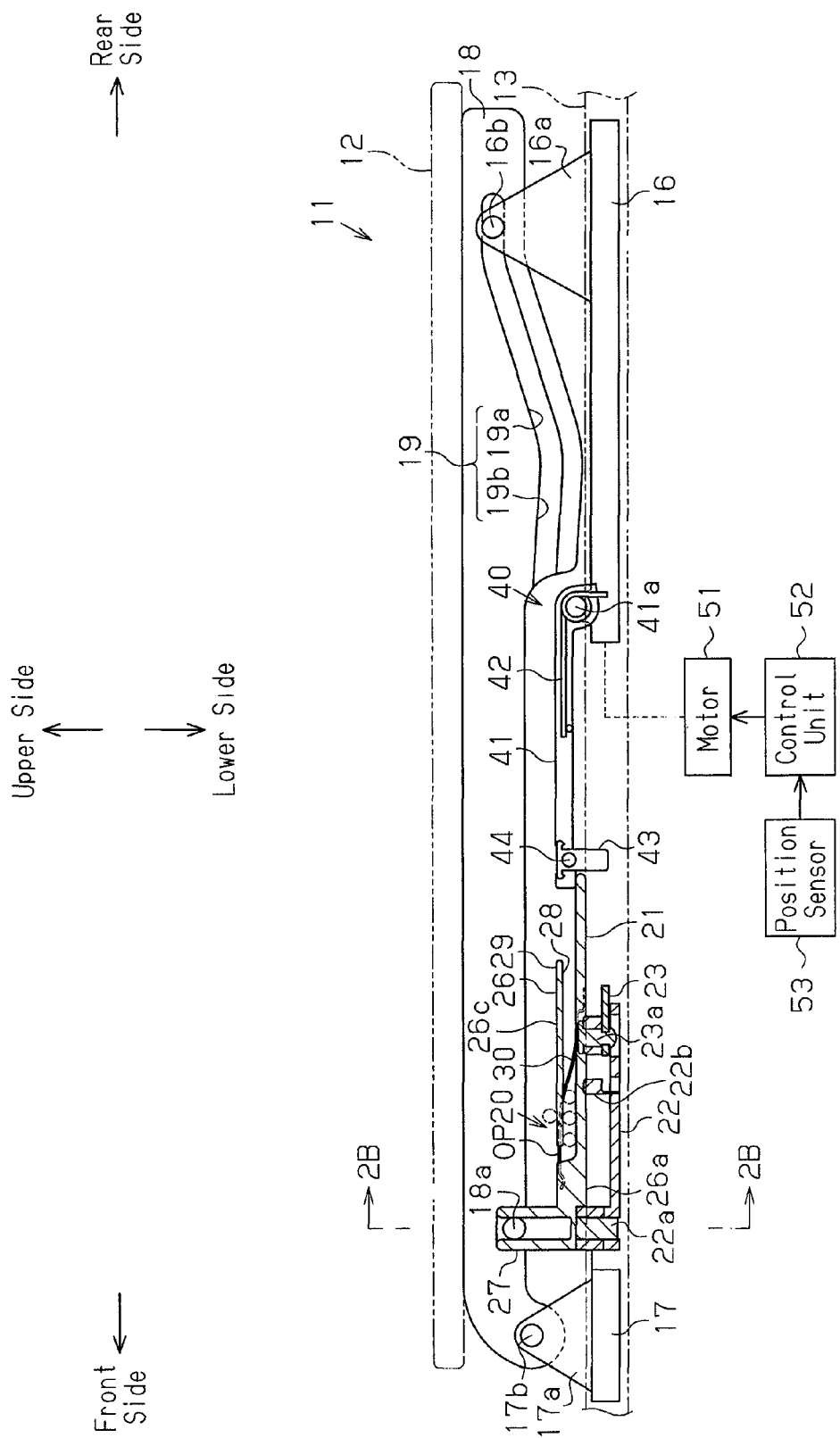
FIG. 1 is a side view showing one embodiment of the present invention.

FIG. 1 is a partially cutaway side view of the sunroof device 11. FIG. 2(a) is a partially cutaway bottom view showing the sunroof device 11 at the front portion of the vehicle, and FIG. 2(b) is a cross-sectional view taken along line 2B-2B. FIG. 2(b) is a cross-sectional view taken along line 2B-2B, and the widthwise direction in FIG. 2(a) is shown in correspondence with FIG. 2(b) to facilitate understanding.

As shown in FIG. 1, the sunroof device 11 includes guide rails 13 that are arranged at the two edges of the roof opening 10a in the widthwise direction of the vehicle and extend in the front and rear directions of the vehicle. Referring to FIG. 2(b), the guide rail 13, which is formed, for example, from an extruded material of aluminum alloy and has a generally C-shaped cross-section, integrally includes a bottom wall 13a, two side walls 13b extending upward from the two ends in the widthwise direction of the bottom wall 13a, and flanges 13c and 13d extending toward each other from the top ends of the side walls 13b.

As shown in FIG. 1, a rear shoe 16 is coupled to the guide rail 13 as a rear slide member in a state fitted with play to the inner wall of the guide rail 13 to be movable in the front and rear directions of the vehicle. The rear shoe 16 includes a generally triangular support piece 16a, which projects upward from the guide rail 13 through the gap between the two flanges 13c and 13d, and a guide pin 16b, which is fixed to the top portion of the support piece 16a and extends toward one widthwise direction of the vehicle (downward in a direction orthogonal to the plane of FIG. 1). Further, a front shoe 17, which is movable in the front and rear directions of the vehicle, is coupled to the guide rail 13 in a state fitted with play to the inner wall of the guide rail 13 at the front side of the rear shoe 16. The front shoe 17 includes a generally triangular support piece 17a, which projects upward from the guide rail 13 through the gap between the two flanges 13c and 13d, and a support shaft 17b, which is fixed to the top portion of the support piece 17a.

A bracket 18, which extends in the front and rear directions of the vehicle, is fixed to the lower surface at the an edge of the movable panel 12 in the widthwise direction. A guide groove 19 is formed in the rear side of the bracket 18 extending in the front and rear directions of the vehicle. The guide groove 19 includes an inclined portion 19a, which extends downward toward the front, and a straight portion 19b, which extends continuously from the front end of the inclined portion 19a and generally parallel to the guide rail 13. The guide pin 16b is movably fitted into the guide groove 19. The front end of the bracket 18 is pivotally coupled by the support shaft 17b to the support piece 17a.

When the movable panel 12 is in a fully closed state, the guide pin 16b is arranged at the rear end of the inclined portion 19a that is the highest part of the guide groove 19. Accordingly, from this state, as the rear shoe 16 moves toward the front of the vehicle and the guide pin 16b moves along the inclined portion 19a to its front end, the bracket 18 (movable panel 12) pivots about the support shaft 17b thereby lifting its rear side (refer to FIG. 3). In this state, the straight portion 19b of the guide groove 19 is set to extend parallel to the guide rail 13. Thus, in the tilt-up state, as the rear shoe 16 moves in the front and rear directions of the vehicle, the movable panel 12 does not move even though the guide pin 16b moves along the straight portion 19b.

As shown in FIG. 1, a check mechanism 20 is arranged in the guide rail 13 at the rear side of the front shoe 17. The check mechanism 20 includes a check block 21, a check lever 22, and an engagement projection restriction lever 23.

Figure 2:
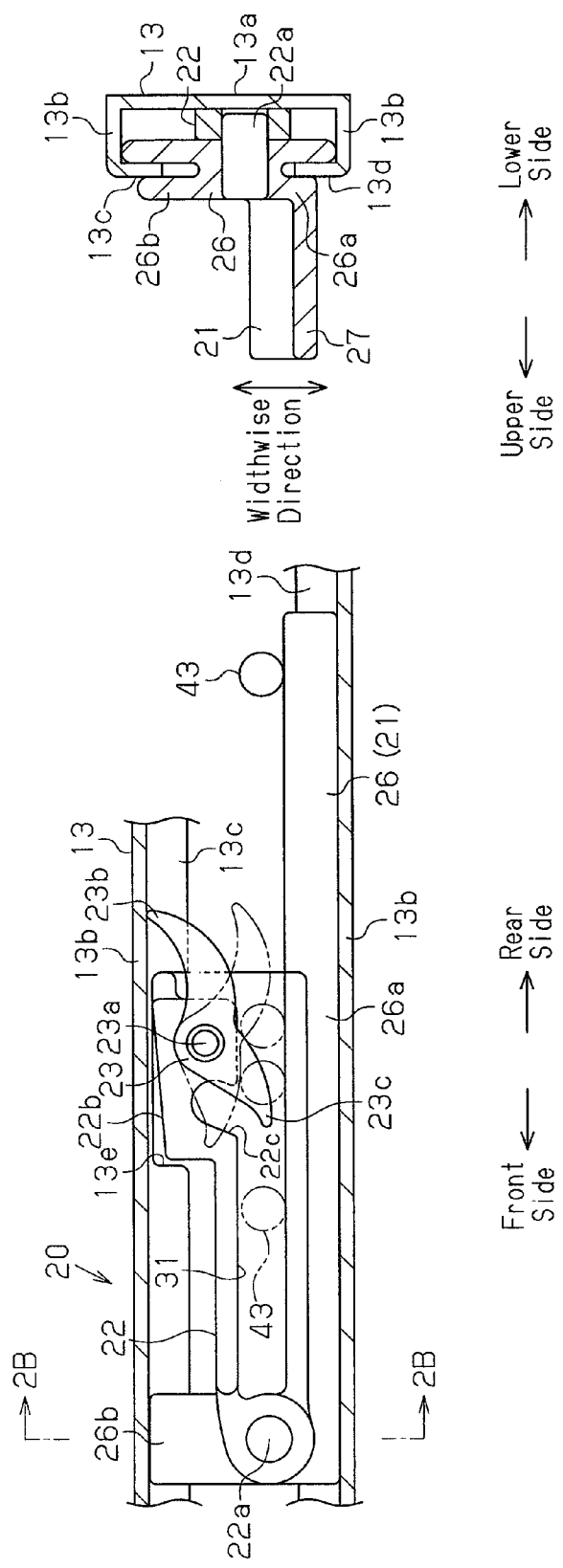
FIG. 2(a) is a bottom view showing the embodiment.
FIG. 2(b) is a cross-sectional view taken along line 2B-2B in FIG. 2(a)

The check block 21 is L-shaped when viewed from aside and integrally includes a main body 26, which extends in the front and rear directions of the vehicle, and a hooking projection 27, which is bent upward from the front end of the main body 26 and hooked to a hooking pin 18a, which is fixed to the bracket 18 and movable in the upward and downward directions. Thus, when the movable panel 12 pivots about the support shaft 17b, the check block 21 allows the movable panel 12 to swing toward the front about the hooking pin 18a in the hooking projection 27. As shown in FIG. 2, the main body 26 includes a guide 26a, which is fitted, over its entire length in the longitudinal direction, to the flange 13d of the guide rail 13 to be movable in the front and rear directions of the vehicle, and a guide 26b, which is fitted at the front end of the of the guide rail 13 to the other flange 13c to be movable in the front and rear directions of the vehicle. In this manner, the check block 21 is coupled by the guides 26a and 26b to be movable in the front and rear directions of the vehicle along the guide rail 13 (flanges 13c and 13d). Accordingly, movement of the check block 21 moves the movable panel 12, which is hooked to the check block 21 (hooking projection 27), together with the front shoe 17 and the like in the front and rear directions of the vehicle.

As shown in FIG. 4, the main body 26 further includes a guide piece 26c, which has a generally L-shaped cross section and projects upward from an upper surface of the guide 26a at a basal side of the flange 13d. The guide piece 26c includes an inner wall surface that forms a first channel 28, which has a generally U-shaped cross-section and opens toward the flange 13c, with the upper surface of the guide 26a. As shown in FIG. 1, the guide piece 26c (first channel 28) extends in the front and rear directions of the vehicle toward the rear of the vehicle from the hooking projection 27 and has a front portion that is open upward through a communication portion OP. The guide piece 26c has an upper surface that forms a second channel 29, which extends in the front and rear directions of the vehicle, in a state overlapped with the upper side of the first channel 28. A plate spring 30, which serves as an urging member, is cantilever-supported by and coupled to the guide 26a adjacent to the first channel 28 and the like in the widthwise direction. The plate spring 30 has a free end serving as a distal portion that extends toward the front of the vehicle and is arranged at a height that generally conforms to the upper surface of the guide piece 26c at the communication portion OP.

As shown in FIG. 2(a), the guide 26b includes a basal portion to which the check lever 22 is pivotally coupled by a support shaft 22a. The check lever 22 includes a generally ax-shaped check portion 22b, which projects from the bottom end of the support shaft 22a (in a downward direction perpendicular to the plane of FIG. 2(*a*)) to the position corresponding to the height of the flange 13*c*. A cutout 13*e*, which is formed in the flange 13*c* at a predetermined position, serves as a generally tetragonal hooking portion to which a generally tetragonal head of the check portion 22*b* can be fitted as the check lever 22 pivots about the support shaft 22*a*. Accordingly, by fitting the check portion 22*b* into the cutout 13*e*, the main body 26 (check block 21) is switched to an immovable state in the front and rear directions of the vehicle and held at a predetermined position located toward the front of the vehicle from the rear shoe 16. Removal of the check portion 22*b* from the cutout 13*e* switches the main body 26 (check block 21) to a movable state that allows movement toward the rear of the vehicle from the predetermined position. The position of the movable panel 12 in the front and rear directions of the vehicle is restricted to a predetermined position when the check block is in the immovable state. The immovable state of the check block 21 is set, for example, when the movable panel 12 is in a fully closed state. An urging member (not shown) constantly urges the check lever 22 toward a direction in which the check portion 22*b* is fitted into the cutout 13*e* (pivoted in counterclockwise direction as viewed in FIG. 2(*a*)).

An engagement groove 22*c*, which faces away from the flange 13*d*, is formed in the tetragonal head of the check 22*b*. The engagement groove 22*c* is inclined to approach the flange 13*c* toward the rear of the vehicle. When the check portion 22*b* is fitted to the cutout 13*e*, an inlet passage 31 is formed between the check lever 22 and the guide 26*a*. The inlet passage 31 extends toward the front and rear from opposite sides of the engagement groove 22*c*. Further, the inlet passage 31 is set to have an opening width that is about the same as the engagement groove 22*c* and extends in the front and rear directions of the vehicle.

As shown in FIG. 2(*a*), a support shaft 23*a* pivotally couples the engagement projection restriction lever 23 to the lower side of the check portion 22*b* at position located toward the distal end (rear side) from the engagement groove 22*c* of the check portion 22*b*. The engagement projection restriction lever 23 includes a hook-shaped abutment piece 23*b* and a hook shaped restriction piece 23*c*. The abutment piece 23*b* extends toward the rear of the vehicle from the support shaft 23*a* and can abut the side wall 13*b* of the flange 13*c*. The restriction piece 23*c* extends toward the front of the vehicle from the support shaft 23*a* and can project into the inlet passage 31. The engagement projection restriction lever 23 is set so that when the check block 21 is in the immovable state and the abutment piece 23*b* is abutting the opposing side wall 13*b*, the restriction piece 23*c* projects into the inlet passage 31 and shuts the inlet passage 31 in the forward and rearward directions of the vehicle. The pivot position of the engagement projection restriction lever 23 in this state is referred to as the "predetermined initial position". Further, the engagement projection restriction lever 23 is set so that by pivoting about the support shaft 23*a* in the clockwise direction as viewed in the drawings, the restriction piece 23*c* allows the inlet passage 31 to open as shown by the double-dashed lines.

An urging member (not shown) constantly urges the engagement projection restriction lever 23 toward a direction in which the abutment piece 23*b* abuts against the side wall 13*b* (pivoted in counterclockwise direction as viewed in FIG. 2(*a*)). The urging force applied to the engagement projection restriction lever 23 is set to be smaller than the urging force applied to the check lever 22 when fitting the check portion 22*b* into the cutout 13*e*. Accordingly, the urging force applied to the engagement projection restriction lever 23 does not separate the check portion 22*b* from the cutout 13*e*.

As shown in FIG. 1, a generally plate-shaped coupling arm 41 is pivotally coupled by a support shaft 41*a* to a front end portion of the rear shoe 16. The coupling arm 41 extends toward the front of the vehicle to the check block 21 (guide 26*a*). A coil spring 42, which is arranged on the support shaft 41*a*, constantly urges the front end of the coupling arm 41 to abut the upper surface of the guide 26*a* on the check block 21 (pivoted in counterclockwise direction as viewed in FIG. 1).

As shown in FIG. 4(*b*), a generally cylindrical engagement portion 43, which opposes the inlet passage 31 and projects downward, is fixed to a front end portion of the coupling arm 41. As shown in FIG. 2(*a*), the engagement projection 43 moves toward the front of the vehicle along the inlet passage 31 as the rear shoe 16 and the coupling arm 41 move toward the front of the vehicle. In this state, the engagement projection 43 pushes the restriction piece 23*c* thereby pivoting the engagement projection restriction lever 23 in the counterclockwise direction as viewed in FIG. 4(*a*) against the urging force applied to the engagement projection restriction lever 23 while passing by the engagement groove 22*c*. This returns the engagement projection restriction lever 23, which is released from the engagement projection 43, to the predetermined initial position.

Further, in this state, when the rear shoe 16 and the coupling arm 41 move toward the rear of the vehicle, the engagement projection 43 pushes the restriction piece 23*c* of the engagement projection restriction lever 23, which is returned to the predetermined initial position. Here, the engagement projection restriction lever 23, which is pushed by the engagement projection 43 and pivoted in the counterclockwise direction as viewed in FIG. 4(*a*), pushes the opposing side wall 13*b* with the abutment piece 23*b*. This pivots the check portion 22*b* (check lever 22) about the support shaft 23*a* in the clockwise direction as viewed in FIG. 4(*a*), that is, in a direction in which the check portion 22*b* is separated from the cutout 13*e* (refer to FIG. 5(*a*)).

As the rear shoe 16 and the coupling arm 41 further move toward the rear of the vehicle, the engagement projection 43, which further pushes the restriction piece 23*c*, starts to enter the engagement groove 22*c* along the restriction piece 23*c* (refer to FIG. 5(*b*)). In this state, the check lever 22 is completely separated from the cutout 13*e* and released from the cutout 13*e*. Further, the check block 21 is switched to the movable state. Accordingly, in this state, when the rear shoe 16 and the coupling arm 41 move further toward the rear of the vehicle, the check lever 22, which hooks to the engagement projection 43 in the engagement groove 22*c*, moves with the check block 21 toward the rear of the vehicle (engagement state).

As shown in FIG. 4(*b*), a generally cylindrical guide projection 44, which projects in a widthwise direction facing toward the first channel 28, is fixed to the front end portion of the coupling arm 41. When the coupling arm 41 abuts the upper surface of the guide 26*a* of the check block 21, the guide projection 44 is inserted into the first channel 28 and movable along the first channel 28 in the front and rear directions of the vehicle. Accordingly, movement of the rear shoe 16 and the coupling arm 41 in the front and rear directions of the vehicle does not affect the engagement of the engagement projection 43 and the engagement projection restriction lever 23.

Figure 6:
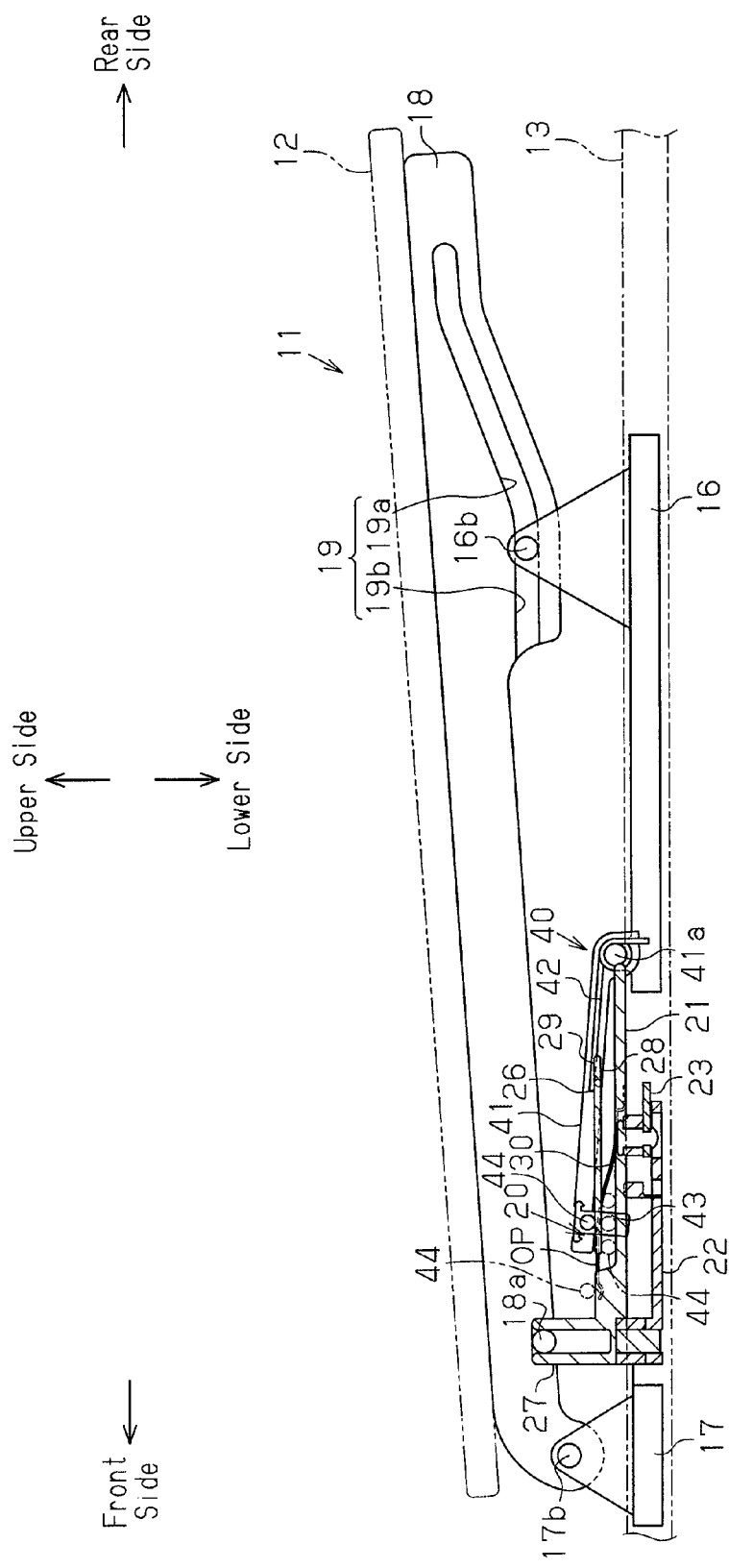
FIG. 6 is a side view showing the operation of the embodiment.

Referring to FIG. 6, as the rear shoe 16 and the coupling arm 41 move toward the front of the vehicle and the guide projection 44 moves over the plate spring 30 and reaches the communication portion OP at the front side of the first channel 28, the coupling arm 41 is pivoted in the clockwise direction as viewed in the drawing in a state in which the guide projection 44, which is urged by the plate spring 30, enters the second channel 29 through the communication portion OP. In this state, the guide projection 44 abuts the upper surface of the guide piece 26c and is movable in the front and rear directions of the vehicle along the second channel 29. Further, the engagement projection 43 is arranged at a position shifted in a heightwise direction of the vehicle by an amount corresponding to the steps of the first and second channels 28 and 29. In this state, the engagement projection restriction lever 23 is set be separates from the movement path of the engagement projection 43 toward the rear of the vehicle. Accordingly, when the guide projection 44 is in the second channel 29, the check block 21 and the like do not move toward the rear of the vehicle even if the rear shoe 16 and the coupling arm 41 move toward the rear of the vehicle (disengaged state). When the guide projection 44 reaches the rear end of the second channel 29 (guide piece 26c), the guide projection 44 is released from the guide piece 26c. As a result, the coil spring 42 urges and pivots (return-pivots) the coupling arm 41 in the counterclockwise direction as viewed in the drawing until abutting the upper surface of the guide 26a of the check block 21. The coupling arm 41, the coil spring 42, the engagement projection 43, and the guide projection 44 form a check cancellation mechanism 40.

The guide pin 16b of the rear shoe 16 is set to be arranged in the straight portion 19b when the guide projection 44 is moving in the first channel 28 or the second channel 29. Accordingly, the movable panel 12 does not move when the check cancellation mechanism 40 switches to the engaged state or the disengaged state. When the check cancellation mechanism 40 is in the engaged state and the rear shoe 16 and coupling arm 41 move integrally with the check block 21 and the like toward the rear of the vehicle, the movable panel 12 moves toward the rear of the vehicle in the tilt-up state and opens the roof opening 10a. When the check cancellation mechanism 40 is in the disengaged state and the rear shoe 16 and coupling arm 41 move toward the rear of the vehicle leaving the check block 21 and the like, the guide pin 16b moves along the inclined portion 19a to its rear end. As a result, the bracket 18 (movable panel 12) is shifted to the fully closed state (recovered) in a state in which its rear end is lowered about the support shaft 17b.

As shown in FIG. 1, the sunroof device 11 includes a motor 51, which serves as an electric drive source that drives and moves the rear shoe 16, and a control unit 52, which drives and controls the motor 51 and is formed by, for example, a microcomputer. The sunroof device 11 further includes a position sensor 53, which is connected to the control unit 52 and serves as a position detector that detects the position of the rear shoe 16 in the front and rear directions of the vehicle (for example, the rotation amount of the motor 51). The control unit 52 drives and controls the motor 51 based on the position of the rear shoe 16 in the front and rear directions of the vehicle detected by the position sensor 53 to open and close the movable panel 12. In particular, the control unit 52 prohibits deactivation of the motor 51 when the check cancellation mechanism 40 moves from the engaged state to a range in the front and rear directions of the vehicle for switching to the disengaged state. This avoids a state in which the position of the rear shoe 16 in the front and rear directions of the vehicle that is detected by the position sensor 53 cannot be determined as whether being in the engaged state or disengaged state of the check cancellation mechanism 40.

The operation of the present embodiment will now be summarized.

As shown in FIG. 1, when the movable panel 12 is in the fully closed state and the check mechanism 20 is immovable, as the rear shoe 16 moves toward the front of the vehicle, the guide pin 16b moves along the inclined portion 19a to its front end. This lifts the bracket 18 (movable panel 12) at the rear end about the support shaft 17b to the tilt-up state. In this state, further movement of the rear shoe 16 toward the front of the vehicle switches the check cancellation mechanism 40 to the engaged state as described above without moving the movable panel 12. Accordingly, in this state, when the rear shoe 16 moves toward the rear of the vehicle, the check mechanism 20 switches to the movable state and moves integrally toward the rear of the vehicle, and the movable panel 12 opens the roof opening 10a in the tilt-up state. Then, when the rear shoe 16 moves toward the front of the vehicle, the check mechanism 20, of which the engagement groove 22c is pushed by the engagement projection 43, moves integrally toward the front of the vehicle. This closes the roof opening 10a with the movable panel 12 in the tilt-up state. Further, the check mechanism 20 returns to the immovable state (refer to FIG. 4).

Figure 3:
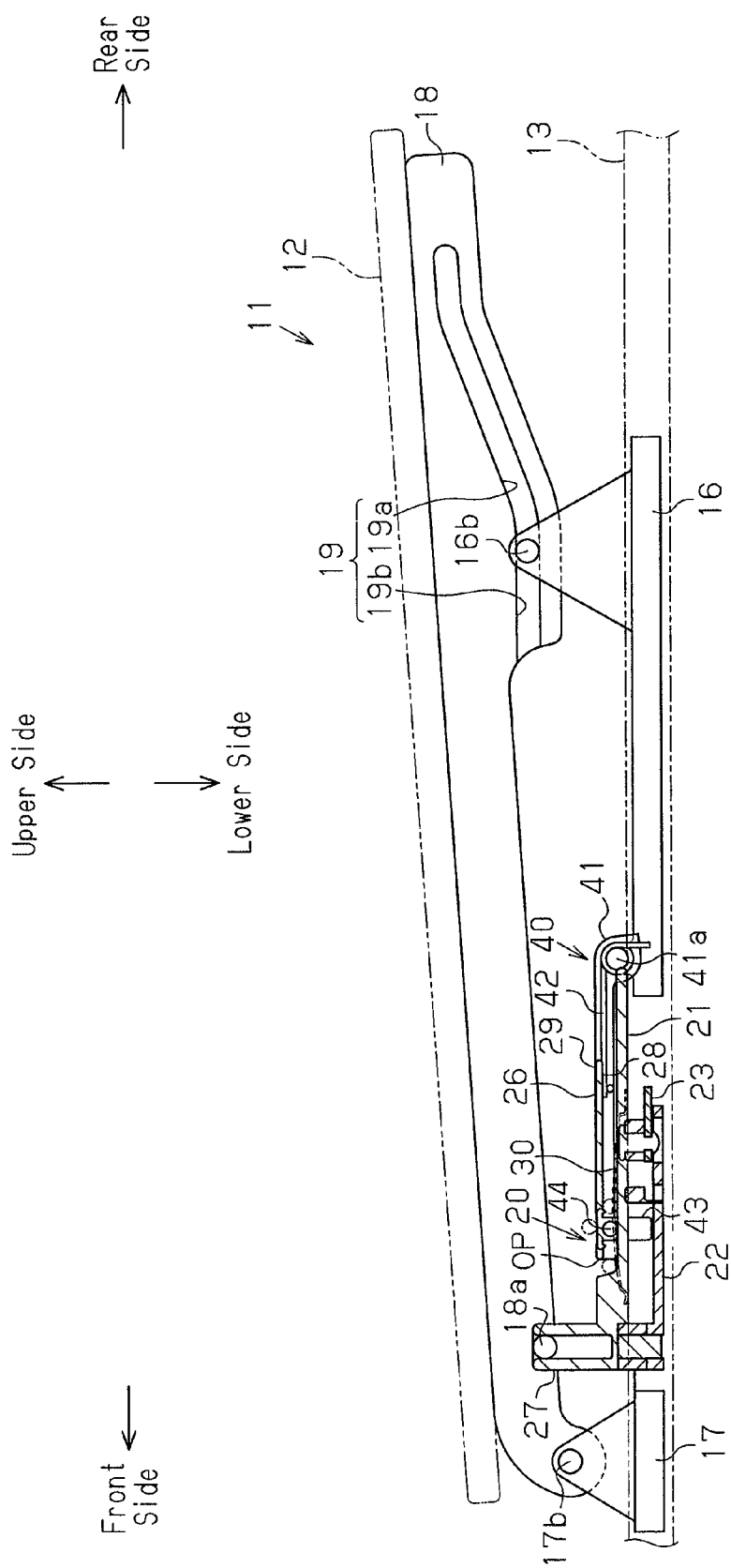
FIG. 3 is a side view showing the operation of the embodiment.

In the state shown in FIG. 3, when the rear shoe 16 further moves toward the front of the vehicle, as shown in FIG. 6, the check cancellation mechanism 40 is switched to the disengaged state as described above without moving the movable panel 12. Accordingly, in this state, when the rear shoe 16 moves toward the rear of the vehicle and the guide pin 16b moves along the inclined portion 19a to its rear end, the bracket 18 (movable panel 12) is lowered at its rear end about the support shaft 17b and shifted to the fully closed state (recovered).

As described above in detail, the present embodiment has the advantages described below.

(1) In the present embodiment, in the engaged state of the check cancellation mechanism 40, when the rear shoe 16 moves toward the rear of the vehicle, the check mechanism 20 is switched to the movable state and moved integrally with the check cancellation mechanism 40 toward the rear of the vehicle. Accordingly, the movable panel 12, which is hooked to the check mechanism 20, opens in the tilt-up state. In this state, the front shoe 17, which is coupled to the movable panel 12, also moves integrally toward the rear of the vehicle. In this case, the maximum movement amount of the rear shoe 16 or the like that determines the fully open state of the movable panel 12 is not restricted by the movement amount of the rear shoe 16 in the reverse direction (toward the front of the vehicle) when the movable panel 12 is shifted to the tilt-up state. It is only required that the movement amount be ensured so that it does not move the movable panel 12, which allows switching of the check cancellation mechanism 40 to the engaged state or the disengaged state. Thus, the maximum movement amount of the rear shoe 16 or the like that determines the fully open state of the movable panel 12, that is, the open amount of the movable panel 12, can be increased accordingly.

When the check cancellation mechanism 40 is in the engaged state, further movement of the rear shoe 16 toward the front of the vehicle switches the check cancellation mechanism to the disengaged state. Accordingly, in this state, when the rear shoe 16 moves toward the rear of the vehicle, after the period in which the movable panel 12 does not move, the rear side of the movable panel 12 linked to the rear shoe 16 is lowered about the front side (hooking pin 18a) of the movable panel 12 hooked to the check mechanism 20 in the immovable state and thereby shifted to the fully closed state (recovered).

When the movable panel 12 is shifted from the fully closed state to the tilt-up state (or vice-versa), a sufficient movement amount is ensured for the rear shoe 16. This decreases the load per unit movement amount on the rear shoe 16 and consequently avoids enlargement of the motor 51.

(2) In the present embodiment, the switching of the check cancellation mechanism 40 from the engaged state to the disengaged state may be performed with an extremely simple function that causes the guide projection 44 to move into (enter) the second channel 29 from the first channel 28. Further, by aiding the movement of the guide projection 44 from the first channel 28 to the second channel 29 with the plate spring 30, the switching of the check cancellation mechanism 40 from the engaged state to the disengaged sate is further ensured.

(3) In the present embodiment, when the check mechanism 20 is in the immovable state, the rear shoe 16 moves toward the front of the vehicle and the engagement projection 43 passes by the engagement groove 22*c*. Then, movement of the rear shoe 16 toward the rear of the vehicle results in the engagement projection 43 being fitted to the engagement groove 22*c* and pushing the engagement groove 22*c*. This switches the check mechanism 20 from the immovable state to the movable state and integrally moves the check cancellation mechanism 40 toward the rear of the vehicle. In this manner, when the check mechanism 20 moves integrally with the check cancellation mechanism 40 toward the rear of the vehicle, the engagement projection 43 fitted to the engagement groove 22*c* integrally moves the check mechanism 20 and the check cancellation mechanism 40 toward the rear of the vehicle in a further stable state.

(4) In the present embodiment, the check mechanism 20 implements the function for hooking the movable panel 12 (i.e., restricting the position of the movable panel 12 in the front and rear directions of the vehicle) and the function for switching between the immovable state and the movable state using two components (check block 21 and check lever 22). This further ensures the operation of each function.

(5) In the present embodiment, the engagement projection 43 passes by the engagement groove 22*c*, and the rear shoe 16 then moves toward the rear of the vehicle. This pushes the guide rail 13, which is engaged with the engagement projection restriction lever 23, with the engagement projection restriction lever 23 and releases the engagement projection restriction lever 23 from the cutout 13*e*. In this manner, the pressing force of the engagement projection 43 from the engagement projection restriction lever 23 is relayed to the guide rail 13. This further ensures switching from the immovable state to the movable state. Further, for example, in comparison with when released from the cutout 13*e* with only the component force produced when the rear shoe 16 moves toward the rear of the vehicle and the engagement projection 43 thereby pushes the engagement groove (22*c*), a steep inclination angle can be set for the engagement groove relative to the front and rear directions of the vehicle. This allows the check lever 22 (check mechanism 20) to be shortened accordingly in the front and rear directions of the vehicle.

(6) In the present embodiment, when the rear shoe 16 moves in a range in the front and rear directions of the vehicle in which the check cancellation mechanism 40 switches from the engaged state to the disengaged state without moving the movable panel 12, the control unit 52 prohibits deactivation of the motor 51. Accordingly, the rear shoe 16 stops in the range in the front and rear directions of the vehicle from the rear shoe 16 shared by the engaged state and the disengaged state of the check cancellation mechanism 40, and avoids a situation in which it cannot be determined whether the check cancellation mechanism 40 is in the engaged state or disengaged state.

(7) In the present embodiment, the load per unit movement amount on the rear shoe 16, that is, the load on the motor 51, is decreased. This stabilizes the operation of the motor 51 and suppresses swinging. Entrapment control based on, for example, the behavior of the motor 51, is further facilitated.

(8) In the present embodiment, the guide projection 44, which enters the first channel 28 as the rear shoe 16 moves toward the front of the vehicle, cannot move out of the first channel 28 due to the engagement of the engagement projection 43 with the check lever 22 and the like even when the rear shoe 16 moves toward the rear of the vehicle. The guide projection 44 can move out of the first channel 28 when the rear shoe 16 moves further toward the front of the vehicle. Thus, the switching of the check cancellation mechanism 40 to the engaged state or the disengaged state is performed in a single direction thereby restricting the movement of the rear shoe 16 toward the front of the vehicle. This improves the reliability of the switching operation. Further, the switching of the check cancellation mechanism 40 to the engaged state or the disengaged state is arranged in a range in which the guide pin 16*b* of the rear shoe 16 moves along the straight portion 19*b* of the guide groove 19 and the movable panel 12 does not move. This minimizes the load on the motor 51 that performs the switching.

(9) In the present embodiment, the components related to operation switching are concentrated at the front side of the movable panel 12. This simplifies the cross-sectional shape and machining process of the guide rail 13.

The above embodiment may be modified as described below.

In the above embodiment, the front shoe 17 may be eliminated. In this case, it is preferable that the front side of the movable panel 12 (bracket 18) be pivotal about the hooking pin 18*a* at the hooking projection 27 of the check mechanism 20 (check block 21). Such a modification reduces the number of components.

In the above embodiment, the switching of the check cancellation mechanism 40 from the engaged state to the disengaged state is performed by offsetting the check cancellation mechanism 40 (guide projection 44) in the heightwise direction of the vehicle relative to the check mechanism (engagement projection restriction lever 23). However, for example, a check cancellation mechanism may be offset in the widthwise direction of the vehicle relative to a check mechanism. Alternatively, the switching of the check cancellation mechanism from the engaged state to the disengaged state may be performed by offsetting a check mechanism in the heightwise direction of the vehicle or the widthwise direction of the vehicle relative to the check cancellation mechanism.

In the above embodiment, after the tilt-up state ends, as the rear shoe 16 moves toward the front of the vehicle, the engagement projection 43 pushes the engagement projection restriction lever 23 to pass the engagement groove 22*c* and switch the check cancellation mechanism 40 to the engaged state. However, one of an engagement projection and a check lever may offset the other one in the heightwise direction of the vehicle or the widthwise direction of the vehicle to pass the engagement groove and switch the check cancellation mechanism to an engaged state.

In the above embodiment, the linking of the rear shoe 16 and the bracket 18 is just one example. For example, the rear shoe 16 (support piece 16*a*) may include a guide groove facing a direction opposite to the guide groove 19, and a guide pin fitted in a movable manner to the guide groove may be fixed to the rear side of the bracket 18.

The invention claimed is:

1. A vehicle sunroof device comprising:
a movable panel that opens and closes an opening formed in a roof of a vehicle;
a guide rail arranged on two edges of the opening in a widthwise direction of the vehicle, wherein the guide rail extends in front and rear directions of the vehicle;
a rear slide member linked to two edges at a rear portion of the movable panel in the widthwise direction and arranged to be movable along the guide rail in the front and rear directions of the vehicle;
an electric drive source that moves the rear slide member;
a check mechanism hooked to two edges at a front portion of the movable panel in a swingable manner, wherein the check mechanism is selectively switched between an immovable state, in which the check mechanism is held at a predetermined position frontward from the rear slide member in the front and rear directions of the vehicle, and a movable state, in which the check mechanism is allowed to move toward the rear of the vehicle from the predetermined position, and wherein when the movable panel is in a fully closed state, the rear slide member moves along the guide rail toward the front of the vehicle to lift the movable panel at its rear side about the front portion hooked to the check mechanism in the immovable state and thereby shift the movable panel to a tilt-up state; and
a check cancellation mechanism arranged on the rear slide member, wherein
the check cancellation mechanism, in the tilt-up state, is switched to an engaged state as the slide member further moves toward the front of the vehicle without moving the movable panel, and the check cancellation mechanism, in the engaged state, integrally moves the check mechanism as subsequent movement of the rear slide member toward the rear of the vehicle switches the check mechanism to the movable state, and
as the rear slide member further moves toward the front of the vehicle without moving the movable panel in the engaged state, the check cancellation mechanism is switched to a disengaged state and released from the check mechanism.

2. The sunroof device according to claim 1, wherein the check cancellation mechanism includes a projection, and the sunroof device further comprises:
a first channel that allows entrance of the guide projection in the immovable state of the check mechanism when the check cancellation mechanism switches to the engaged state as the rear slide member moves toward the front of the vehicle;
a second channel in communication with a front end of the first channel, wherein the second channel switches the check cancellation mechanism to the disengaged state when the guide projection enters; and
an urging member that urges and moves the guide projection from the first channel to the second channel in a communication portion of the first channel and the second channel.

3. The vehicle sunroof device according to claim 2, wherein the check mechanism includes the first channel, the second channel, and the urging member.

4. The vehicle sunroof device according to claim 1, wherein
the check mechanism includes an engagement groove, and the check cancellation mechanism includes an engagement projection, wherein
the engagement projection passes the engagement groove of the check mechanism in the immovable state as the rear slide member moves toward the front of the vehicle, and
the engagement projection is fitted to the engagement groove by subsequent movement of the rear slide member toward the rear of the vehicle and presses the engagement groove to integrally move the check mechanism.

5. The sunroof device according to claim 4, wherein the check mechanism includes:
a check block hooked to the movable panel and arranged to be movable along the guide rail in the front and rear directions of the vehicle; and
a check lever including the engagement groove and pivotally coupled to the check block, wherein the check lever is urged toward and hooked to a hooking portion formed in the guide rail at the predetermined position to maintain the immovable state.

6. The sunroof device according to claim 5, wherein
the check mechanism includes an engagement projection restriction lever, wherein the engagement projection restriction lever is pivotally coupled to the check lever, and the engagement projection restriction lever is held at a predetermined initial position engaging the guide rail when receiving urging force; and
the engagement projection pivots the engagement projection restriction lever against the urging force and passes the engagement groove as the rear slide member moves toward the front of the vehicle, and subsequent movement of the rear slide member toward the rear of the vehicle pushes, with the engagement projection restriction lever, the guide rail, which is engaged with the engagement projection restriction lever, and releases the check lever from the hooking portion.

7. The sunroof device according to claim 1, comprising:
a position detector that detects the position of the rear slide member in the front and rear directions of the vehicle; and
a control unit that controls and drives the electric drive source based on the position of the rear slide member in the front and rear directions of the vehicle, wherein the control unit prohibits deactivation of the electric drive source when the check cancellation mechanism is in a range switched from the engaged state to the disengaged state and the rear slide member moves in a range in the front and rear directions of the vehicle without moving the movable panel.

8. A vehicle sunroof device comprising:
a movable panel that opens and closes an opening formed in a roof of a vehicle;
a guide rail arranged on two edges of the opening in a widthwise direction of the vehicle, wherein the guide rail extends in front and rear directions of the vehicle;
a slide member linked to two edges at the movable panel in the widthwise direction and arranged to be movable along the guide rail in the front and rear directions of the vehicle;
an electric drive source that moves the slide member;
a check mechanism arranged in the guide rail so as to be selectively switched between an immovable state, in which the check mechanism is held at a predetermined position, and a movable state, in which the check mechanism is allowed to move toward the rear of the vehicle from the predetermined position, and wherein the movable panel is in a fully closed state, the slide member moves along the guide rail toward the front of the vehicle to lift the movable panel at its rear side about a front portion in the immovable state and thereby shift the movable panel to a tilt-up state; and a check cancellation mechanism arranged on the slide member, wherein the check cancellation mechanism, in the tilt-up state, is switched to an engaged state as the slide member further moves toward the front of the vehicle without moving the movable panel, and the check cancellation mechanism, in the engaged state, integrally moves the check mechanism as subsequent movement of the slide member toward the rear of the vehicle switches the check mechanism to the movable state, and as the slide member further moves toward the front of the vehicle without moving the movable panel in the engaged state, the check cancellation mechanism is switched to a disengaged state and released from the check mechanism.

\* \* \* \* \*